(12) United States Patent
Chheda et al.

(10) Patent No.: US 11,086,531 B2
(45) Date of Patent: *Aug. 10, 2021

(54) SCALING EVENTS FOR HOSTING HIERARCHICAL DATA STRUCTURES

(71) Applicant: Amazon Technologies, Inc., Seattle, WA (US)

(72) Inventors: Mahendra Manshi Chheda, Sammamish, WA (US); Srikanth Mandadi, Redmond, WA (US); Alazel Acheson, Redmond, WA (US); Christopher Ryan Baker, Seattle, WA (US); Matthew William Berry, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/575,258

(22) Filed: Sep. 18, 2019

(65) Prior Publication Data
US 2020/0012441 A1 Jan. 9, 2020

Related U.S. Application Data

(63) Continuation of application No. 15/475,034, filed on Mar. 30, 2017, now Pat. No. 10,423,342.

(51) Int. Cl.
G06F 3/06 (2006.01)
(52) U.S. Cl.
CPC ............ G06F 3/0619 (2013.01); G06F 3/065 (2013.01); G06F 3/0685 (2013.01)
(58) Field of Classification Search
None
See application file for complete search history.

(56) References Cited

U.S. PATENT DOCUMENTS

| 7,424,671 B2 | 9/2008 | Elza et al. |
| 7,483,923 B2 | 1/2009 | Novik |

(Continued)

FOREIGN PATENT DOCUMENTS

| JP | 2008538632 | 10/2008 |
| JP | 2015232879 | 12/2015 |

(Continued)

OTHER PUBLICATIONS

"Azure AD: Under the hood of our geo-redundant, highly available, distributed cloud directory," Alex Simons, Sep. 2, 2014, available at https://blogs.technet.microsoft.com/ad/2014/09/02/azure-ad-under-the-hood-of-our-geo-redundant-highly-available-distributed-cloud-directory/#, pp. 1-9.

(Continued)

*Primary Examiner* — William E. Baughman
(74) *Attorney, Agent, or Firm* — Robert C. Kowert; Kowert, Hood, Munyon, Rankin & Goetzel, P.C.

(57) ABSTRACT

Scaling events may be detected for hosting hierarchical data structures. Scaling events may be detected to modify the capacity of a data store for hierarchical data structures to handle changing write workloads, read workloads, or storage capacity. Hierarchical data structures may be moved from one group of storage hosts to another group of storage hosts according to a filtered snapshot that includes the hierarchical data structures to be moved that is provided to the destination storage hosts. Changes made to the hierarchical data structures made at the source storage hosts during the move can be applied to the filtered snapshot so that the hierarchical data structures may be made available at the destination storage hosts inclusive of the changes.

20 Claims, 12 Drawing Sheets

(56) References Cited

U.S. PATENT DOCUMENTS

| | | |
|---|---|---|
| 7,549,028 B2 | 6/2009 | Thompson et al. |
| 7,603,393 B1 | 10/2009 | Cote et al. |
| 7,617,262 B2 | 11/2009 | Prahlad et al. |
| 7,689,602 B1 | 3/2010 | Sim-Tang |
| 7,734,578 B2 | 6/2010 | Prahlad et al. |
| 7,822,711 B1 | 10/2010 | Ranade |
| 8,024,294 B2 | 9/2011 | Kottomtharayil |
| 8,489,656 B2 | 7/2013 | Erofeev |
| 8,789,208 B1 | 7/2014 | Sundaram et al. |
| 8,849,955 B2 | 9/2014 | Prahlad et al. |
| 8,880,474 B2 | 11/2014 | Mason et al. |
| 9,053,124 B1 | 6/2015 | Dornquast et al. |
| 10,031,935 B1 | 7/2018 | Cole et al. |
| 2003/0158869 A1 | 8/2003 | Micka |
| 2005/0086384 A1 | 4/2005 | Ernst |
| 2005/0210209 A1 | 9/2005 | Nagata |
| 2007/0150341 A1 | 6/2007 | Zia et al. |
| 2007/0180208 A1 | 8/2007 | Yamasaki |
| 2007/0185938 A1 | 8/2007 | Prahlad et al. |
| 2007/0186068 A1 | 8/2007 | Agrawal |
| 2007/0226730 A1 | 9/2007 | Coyle et al. |
| 2008/0104443 A1 | 5/2008 | Akutsu et al. |
| 2009/0006489 A1 | 1/2009 | Ramasubramanian et al. |
| 2010/0023716 A1 | 1/2010 | Nemoto et al. |
| 2010/0030752 A1 | 2/2010 | Goldentouch |
| 2010/0058010 A1 | 3/2010 | Augenstein et al. |
| 2010/0174692 A1 | 7/2010 | Meyer et al. |
| 2011/0153566 A1 | 6/2011 | Larson et al. |
| 2014/0279929 A1 | 9/2014 | Gupta et al. |
| 2015/0356019 A1 | 12/2015 | Johar et al. |
| 2015/0363468 A1 | 12/2015 | Alvey et al. |
| 2016/0283329 A1 | 9/2016 | Natanzon |
| 2018/0150496 A1 | 5/2018 | Kim et al. |

FOREIGN PATENT DOCUMENTS

| | | |
|---|---|---|
| JP | 2016511489 | 4/2016 |
| KR | 10-2015-0122226 | 10/2015 |
| WO | 2006115589 | 11/2006 |
| WO | 2014150538 | 9/2014 |

OTHER PUBLICATIONS

U.S. Appl. No. 15/132,098, filed Apr. 18, 2016, Srikanth Mandadi, et al.

U.S. Appl. No. 15/475,020, filed Mar. 30, 2017, Srikanth Mandadi, et al.

U.S. Appl. No. 15/475,007, filed Mar. 30, 2017, Mahendra Manshi Chheda, et al.

U.S. Appl. No. 15/475,024, filed Mar. 30, 2017, Mahendra Manshi Chheda, et al.

U.S. Appl. No. 15/475,031, filed Mar. 30, 2017, Alazel Acheson, et al.

SCALING EVENTS FOR HOSTING HIERARCHICAL DATA STRUCTURES

This application is a continuation of U.S. patent application Ser. No. 15/475,034, filed Mar. 30, 2017, which is hereby incorporated by reference herein in its entirety.

BACKGROUND

Hierarchical storage systems have implemented many different storage schemes for efficiently and reliability persisting data. Storage schemes implemented on distributed system architecture are often deployed when storage system client applications require greater availability of the data persisted in the data storage system. Common solutions to making data available including storing one or more versions or replicas of data on multiple storage hosts. However, by increasing the number of versions or replicas, the complexity and operational costs for generating consistent views of hierarchical data increases. For example, synchronization protocols may require that a single component be allowed to handle operations such as writes or other modifications to the hierarchical data. Such a synchronization protocol would reduce the availability of the distributed system to respond to client requests, as the single component may become overburdened. Thus, scaling techniques that account for both capacity of distributed storage systems and the capacity of the synchronization protocol may be desirable.

Figure 1:
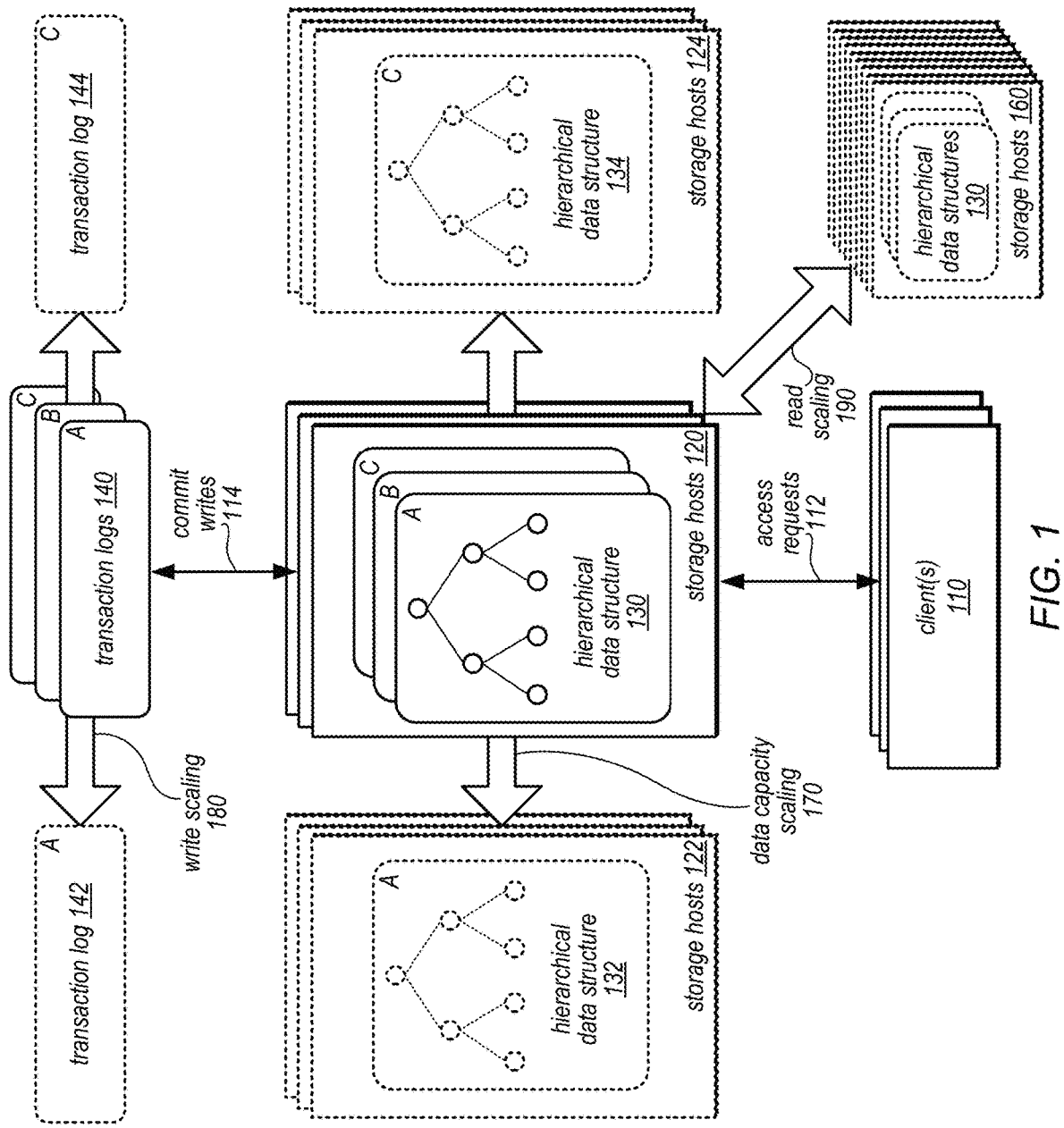
FIG. 1 is a logical block diagram illustrating scaling events for hosting hierarchical data structures, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of scaling events for hosting hierarchical data structures are described herein. FIG. 1 is a logical block diagram illustrating scaling events for hosting hierarchical data structures, according to some embodiments. A hierarchical data structure, such as hierarchical data structure 120 may be stored as part of a hierarchical data store, in some embodiments. A hierarchical data structure may include one or multiple objects organized according to one or multiple links that provide relationships, paths or other form of hierarchy between objects, in some embodiments. In this way, the relationship of objects, and data values associated or stored as part of objects, can be modeled and maintained in the data structure. For example, an organization chart indicating the reporting structure between company managers and employees can be modeled in a hierarchical data structure that indicates the relationship between employees, and may include data specific to each employee (e.g., name, assignment, years of service, etc.), in one embodiment.

Respective copies of hierarchical data structures can be maintained on multiple different storage hosts, such as storage hosts 120, in some embodiments. For example, each storage host 120 may maintain the same set of hierarchical data structures (e.g., hierarchical data structures A, B, and C) so that any one of the storage hosts 120 can process an access request 112 (e.g., a request to read, write, update, delete, or otherwise access) to any of the hierarchical data structures from multiple different client(s) 110, in one embodiment. In this way, load balancing schemes and other request routing techniques can be implemented to distribute the work for handling access requests amongst multiple storage hosts, so that access requests greater in number or work than could be handled by any one storage host can be processed. Storage hosts 120 may rely upon a transaction log or logs to provide a consistency mechanism when updating the replica of the hierarchical data structure at one of the storage hosts 120, such as transaction logs 140. A write request, for instance, may be committed 114 to the transaction log 140. If the attempt to commit the write request to the log succeeds, as discussed below with regard to FIG. 5, then other storage hosts may receive and apply the committed writes from the transaction log 140.

Over time the capacity of the storage hosts 120 or transaction logs 140 to keep upon with demand (e.g., the number of requests to read or write to a hierarchical data structure ("heat") or the increasing size of hierarchical data structures) may exhaust the capabilities of storage nodes and/or transaction logs to handle the demand. Scaling events can be detected to increase the capability of a hierarchical data store (e.g., directory storage service 220 in FIG. 2) to handle the increase in demand. Different types of scaling events may be detected, determined, and/or performed, in some embodiments.

For example, in at least some embodiments, a scaling event may move one or more hierarchical data structures from one set of storage hosts to another set of storage hosts. As illustrated in FIG. 1, storage hosts 122, may be launched, started up, taken over, or otherwise provisioned to store hierarchical data structure 132 (e.g., hierarchical data structure A) and service access requests to hierarchical data structure 132, in some embodiments. As discussed below with regard to FIGS. 6, 9, and 10, the hierarchical data structure may be provided to storage hosts 122 as part of a filtered snapshot that excludes other hierarchical data structures not being moved from storage hosts 120 to storage hosts 122 (e.g., hierarchical data structures B and C). The movement of the hierarchical data structures may split, merge, or otherwise redistribute the hierarchical data structures hosted by storage hosts 120 in order to relieve some of the burden of processing access requests to the hierarchical data structure. Additionally, as illustrated in FIG. 1, the movement of a hierarchical data structures to other storage hosts may increase the data capacity available for hierarchical data structures at the storage hosts (e.g., by only storing 2 or 1 hierarchical data structures instead of 3, storage hosts 120 can store more data individually for each hierarchical data structure 130). Scaling events to move hierarchical data structures can be performed multiple times to further distribute hierarchical data structures, such as moving hierarchical data structure 134 (e.g., hierarchical data structure C) to storage hosts 124. Storage space for the hierarchical data structures (e.g., A and C) can then be garbage collected or otherwise reclaimed at storage hosts 120.

Another type of scaling event may be performed with respect to transaction logs 140 to increase the capacity to commit writes 114 to transaction logs 140, performing write scaling 180. Each transaction log may be responsible for committing writes to one or more hierarchical data structures, in some embodiments. As the number of write commitments 114 to transaction logs 140 grows, the capacity of transaction logs 140 to handle write demand may not be enough. In order to increase the capacity of transaction logs 140 to handle write demand, the transaction log for one or more hierarchical data structures may be moved or transitioned to a separate transaction log (e.g., which may be separately hosted or managed, in some embodiments). For example, instead of hosting multiple transaction logs (e.g., A, B, and C) 140 together, new transaction logs, such as transaction logs 142 and 144 may be added, in some embodiments, in order to shift requests to commit writes for corresponding hierarchical data structures to the additional transaction logs. In this way, the burden of handling requests to commit writes to transaction logs 140 may be reduced.

Another type of scaling event may be performed with respect to the group of storage hosts maintaining replicas of the same hierarchical data structures, such as storage hosts 120, to add additional storage hosts to scale the read capacity 190 for the hierarchical data structures 130. For example, additional storage nodes 160 may be provisioned and added to the group of hierarchical data structures 120, which may store the same hierarchical data structures 130. In this way, access requests 112 can also be sent or routed to the additional storage hosts 160 to provide additional capacity to process the access requests.

Please note, FIG. 1 is provided as a logical illustration of a hierarchical data structures, storage hosts, transaction logs, and scaling events for hosting hierarchical data structures, and is not intended to be limiting as to the physical arrangement, size, or number of components, modules, or devices, implementing such features.

The specification first describes an example of directory storage service that performs scaling events for hosting hierarchical data structures at the directory storage service, according to various embodiments. The example directory storage service may store hierarchical data structures for many different clients, in various embodiments. Included in the description of the example directory storage service are various aspects of the example directory storage service along with the various interactions between the directory storage service and clients. The specification then describes a flowchart of various embodiments of methods for scaling events for hosting hierarchical data structures. Next, the specification describes an example system that may implement the disclosed techniques. Various examples are provided throughout the specification.

Figure 2:
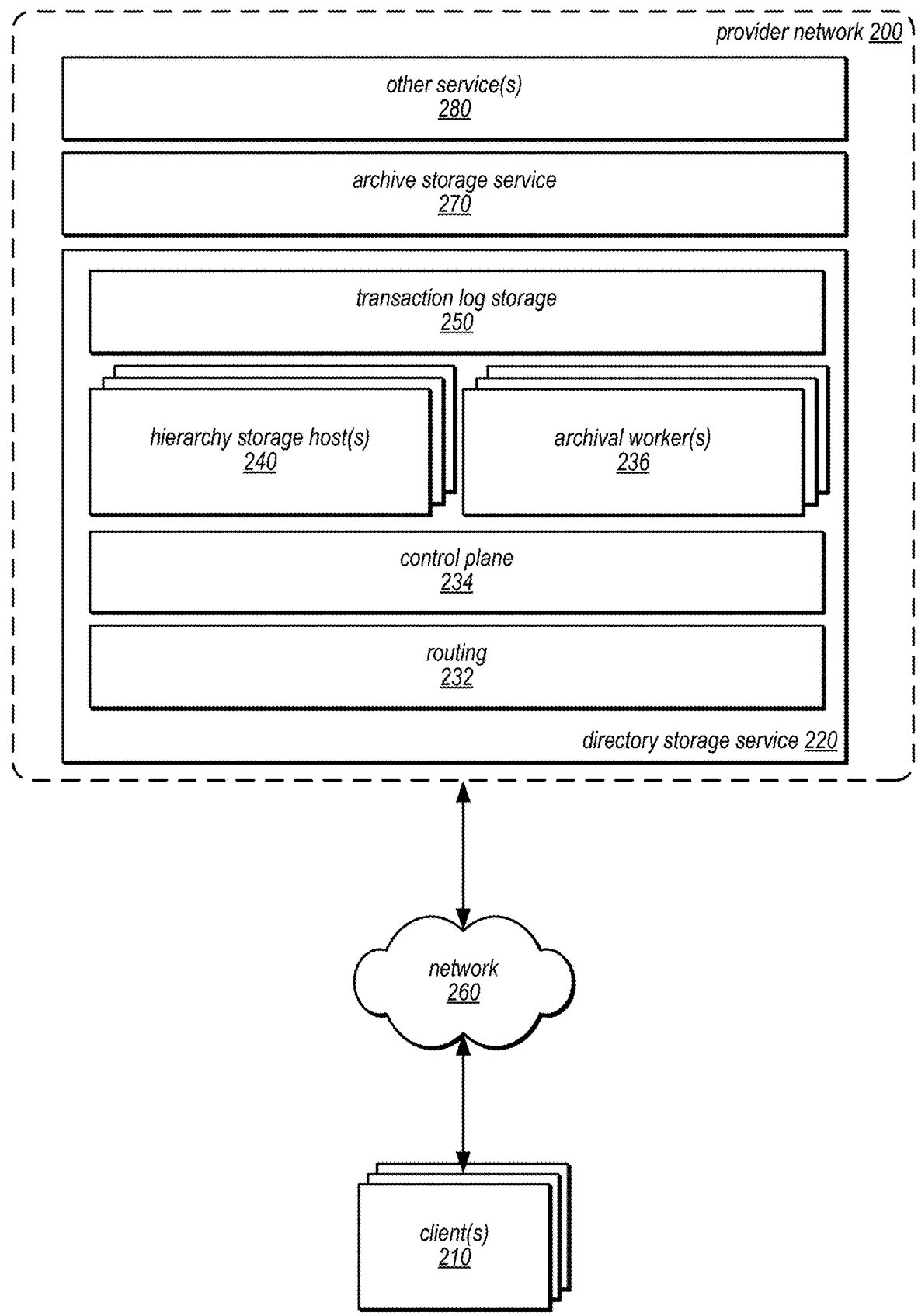
FIG. 2 is a block diagram illustrating a provider network that implements a directory storage service including a hierarchical data store that performs detects and performs scaling events for hosting hierarchical data structures, according to some embodiments.

FIG. 2 is a block diagram illustrating a provider network that implements a directory storage service including a hierarchical data store that performs detects and performs scaling events for hosting hierarchical data structures, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 2000 described below with regard to FIG. 12), needed to implement and distribute the infrastructure and services offered by the provider network 200. In some embodiments, provider network 200 may implement a directory storage service 220, to provide hierarchical data storage services, archive storage service 270 and/or any other type of network based services 280 (other computing resources or services, such as a virtual compute service and storage services, such as object storage services, block-based storage services, data warehouse storage service, or any other types of storage, processing, analysis, communication, event handling, visualization, and security services). Clients 210 may access these various services offered by provider network 200 via network 260. Likewise network-based services may themselves communicate and/or make use of one another to provide different services. For example, various ones of other service(s) 280 may store, access, and/or rely upon hierarchical data structures stored in directory storage service 220.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 12 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Figure 4:
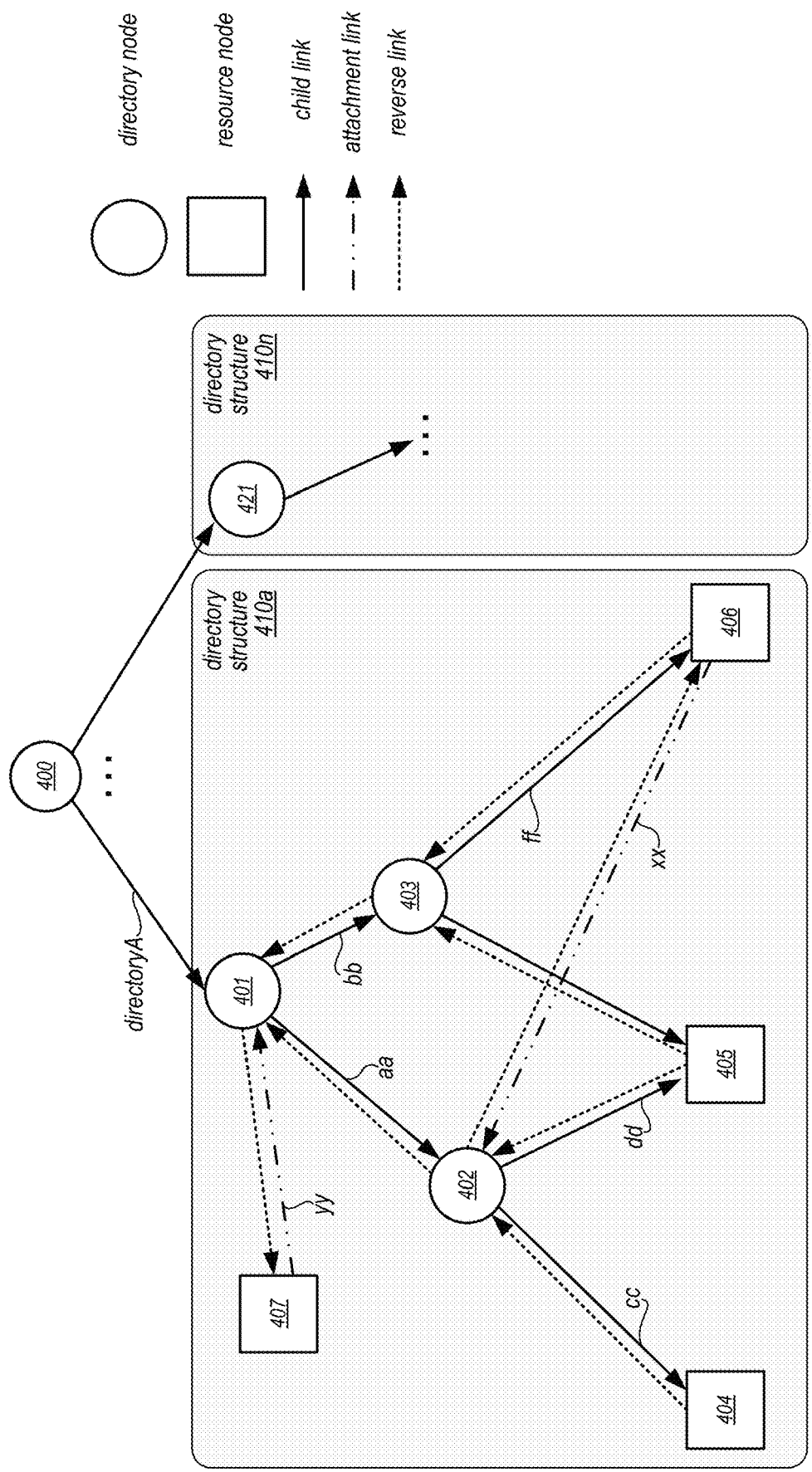
FIG. 4 is a block diagram illustrating a data model for a hierarchal data store that provides hierarchical data structures, according to some embodiments.

Directory storage service 220 may store, manage, and maintain hierarchical data structures, such as a directory structure discussed below with regard to FIG. 4, stored at various ones of hierarchy storage host(s) 240 (in single tenant or multi-tenant fashion). Clients of directory storage service 220 may operate on any subset or portion of the hierarchical data structure with transactional semantics and/or may perform path-based traversals of hierarchical data structures. Such features allow clients to access hierarchical data structures in many ways. For instance, clients may utilize transactional access requests to perform multiple operations concurrently, affecting different portions (e.g., nodes) of the hierarchical directory structure (e.g., reading parts of the hierarchical directory structure, adding a node, and indexing some of the node's attributes, while imposing the requirement that the resulting updates of the operations within the transaction are isolated, consistent, atomic and durably stored).

Figure 5:
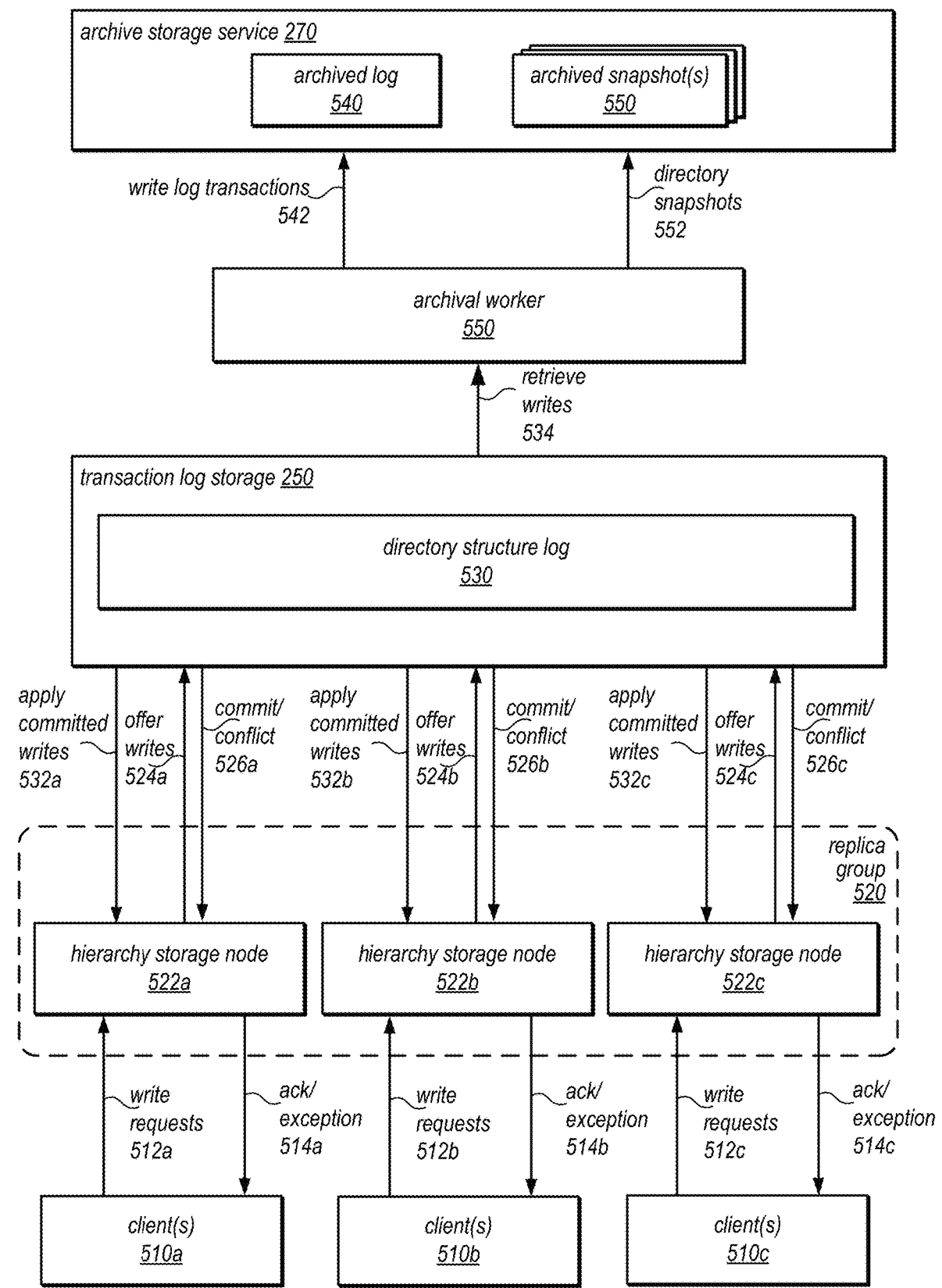
FIG. 5 is a block diagram illustrating the use of a separate transaction log store to provide consistent storage for hierarchical data structures, according to some embodiments.

In various embodiments, directory storage service 220 may implement routing layer 232 to direct access requests from internal or external clients to the appropriate hierarchical storage host(s) 240. For example, routing layer 232 may implement a fleet of routing nodes that maintain mapping information which identifies the locations of a hierarchical data structures on hierarchy storage host(s) 240. When an access request is received, routing layer nodes may then determine which one of the hierarchy storage host(s) that hosts the hierarchical data structure identified in the access request to send the access request. Consider a scenario where hierarchical data structures may be replicated across multiple different hierarchy storage hosts 240 as part of a replica group, such as illustrated in FIG. 5 discussed below. Routing 232 may implement various load balancing schemes to direct requests from different clients to different hierarchy storage hosts within the replica group, so that no single hierarchy storage host becomes overburdened. Moreover, as hierarchy storage hosts 240 may utilize tokens to maintain state across different access requests sent by clients so that different hierarchy storage host(s) 240 may handle each request from the client, routing 232 need not track which hierarchy storage host is communicating with which client.

Control plane 234 may implement various control functions to manage the hierarchy storage host(s) 240 and other components of directory storage service 220 that provide storage of hierarchical data structures, such as directing creation and placement of new hierarchical data structures on hierarchy storage host(s) 240, storage scaling, heat management, node repair and/or replacement. For example, various placement schemes may utilize techniques such as consistent hashing (e.g., based on hashing an identifier for individual hierarchical data structures) to identify hierarchy storage host(s) to store versions of the hierarchical data structure, or randomly mapping hierarchical data structures to a number hierarchy storage host(s) 240 that form a replica set. To provide heat management, for example, control plane 234 may collect hierarchy storage host(s) 240 metrics published by each host. Each host may have various thresholds for performance characteristics, such as memory utilization, CPU utilization, disk utilization, and request-rate capacity. When a hierarchy storage host reports metrics that exceed a threshold (or multiple thresholds), control plane 234 may determine and perform a scaling events for hierarchy storage e hosts, as discussed below with regard to FIGS. 6-8. For example control plane 235 may direct the migration of one or more hierarchical data structures to different hierarchy storage hosts. Similarly, control plane 234 may detect when certain hierarchy storage hosts are unable to keep up with access requests directed to a particular replica group for a hierarchical data structure and may provision additional hierarchy storage host(s) to horizontally scale the replica group to better meet the access request demand.

Figure 3:
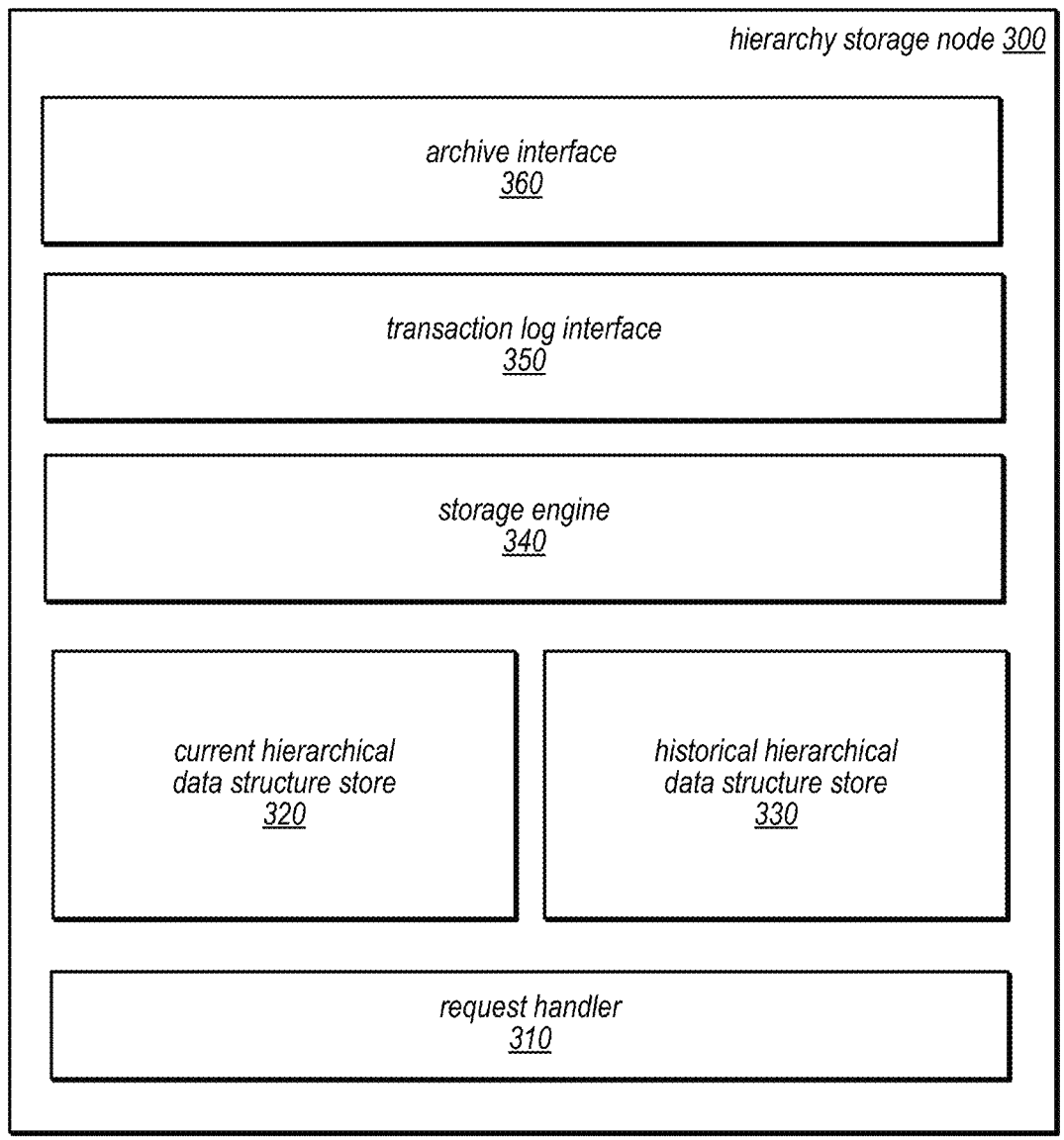
FIG. 3 is a block diagram illustrating a hierarchy storage host, according to some embodiments.

Hierarchy storage host(s) 240 may maintain and handle access to hierarchical storage hosts in directory storage service 220. FIG. 3 is a block diagram illustrating a hierarchy storage host, according to some embodiments. Hierarchy storage host 300 may implement request handler 310 to process access requests and pass along appropriate instructions or requests to other components, such as storage engine 340, transaction log interface 350 or archive interface 360. For example, access request handler 310 may interpret various requests formatted according to a programmatic interface, such as an application programming interface (API). Access requests may include various ones of the requests described in the aforementioned figures as well as other types of requests, such as various access requests to create, update, attach, detach, delete and query nodes in a hierarchical data structure, and access requests to define, populate, discover, and query a local index (which may be strongly consistent and maintained as part of or separately from the hierarchical data structure) on hierarchical data structure node attributes.

In various embodiments, storage engine 340 may be a storage engine configured to interact with structure or format of data as it is stored in current hierarchical data structure store 320 and historical hierarchical data structure store 330 (e.g., a key-value storage engine for data maintained in key-value storage format, relational data storage engine for data maintained in a relational storage format, etc.), which may be maintained according to the models discussed below with regard to FIG. 4. In some embodiments, current hierarchical data structure store 320 may be partially or completely implemented in memory or other quick access storage devices, such as random access memory devices (RAM), as well as utilizing persistent block-based storage devices to store historical hierarchical data structure 330, including magnetic disk or solid state drives. In some embodiments, caching techniques may be implemented so that frequently accessed portions of data, such as frequently access portions of current hierarchical data structures are maintained in memory components whereas other portions are maintained in block-based persistent storage components. Hierarchy storage host 300 may operate multi-tenant storage for hierarchical data structures so that different hierarchical data structures maintained on behalf of different clients, accounts, customers, and the like may be maintained in current hierarchical data structure store 320 and current hierarchical data structure store 330. For example, hierarchy storage host 300 may participate in different replica groups with different hierarchy storage hosts for the different hierarchical data structures stored at hierarchy storage host 300.

Transaction log interface 350 may provide capabilities to interact with (e.g., validate transactions) with respect to the logs corresponding to hierarchical data structures stored in transaction log storage 250 for the hierarchical data structures. Similarly, archive interface 360 may be implemented to retrieve archived transactions or snapshots to service an access request for historical changes to the hierarchical data structure, a historical query, or other access requests that require a version of the hierarchical data structure that is older than that maintained in historical hierarchical data structure store.

Turning back to FIG. 2, transaction log storage 250 may provide a fault tolerant, high performance, durable, log publishing service. Transaction log storage 250 may be used as a commit log underlying strongly consistent distributed applications such as databases, key-value stores, and lock managers, and as illustrated in FIG. 2 directory storage service 220 providing hierarchical data storage. Transaction log storage 250 may provide strong consistency guarantees and support constraints between committed records, to enable features like deduplication, sequencing, and read-write conflict detection. For example, for various different kinds of requests to change hierarchical data structures, transaction log storage 250 may determine whether or not to commit the changes to the hierarchical data structures (e.g., write requests and other modifications) by examining a proposed transaction for conflicts with other committed transactions. Such a feature may provide a fine-grained locking model over the hierarchical data structure (e.g., only those portions of the hierarchical data structure affected by a conflict between transactions may be locked). Transaction log storage 250 may maintain a separate log or chain of log records within a shared log for each hierarchical data structure, serving as an authoritative definition of the changes to the state hierarchical data structure over time. Transactions may be ordered according to transaction sequence numbers, which may be monotonically increasing to reference the state of a hierarchical data structure at individual points in time. Note that in some embodiments, transaction log storage 250 may be a separate network-based storage service implemented as part of provider network 250 external to directory storage service 220.

Archival worker(s) 236 may utilize transactions stored for different hierarchical data structures stored in respective transaction logs in transaction log storage 250 to generate and store snapshots of the hierarchical data structure at different points in time in archive storage service 270. For example, archival management may determine when snapshots of a hierarchical data structure should be captured, provision appropriate storage locations in archive storage service 270, and direct archive worker nodes (not illustrated) to perform the read, write, and other operations to generate and place the snapshots in archive storage service 270. Similarly, archival worker(s) 236 may direct the copying and storage of individual log records/transactions and/or groups of log records and transactions to be stored as part of an archived transaction log for hierarchical data structures in archive storage service 270.

Generally speaking, clients 210 may encompass any type of client configurable to submit network-based services requests to provider network 200 via network 260, including requests for directory services (e.g., a request to create or modify a hierarchical data structure to be stored in directory storage service 220, etc.). For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of persistent storage resources to store and/or access one or more hierarchical data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 210 may be an application configured to interact directly with network-based services platform 200. In some embodiments, client 210 may be configured to generate network-based services requests according to a Representational State Transfer (REST)-style network-based services architecture, a document- or message-based network-based services architecture, or another suitable network-based services architecture.

In some embodiments, a client 210 may be configured to provide access to network-based services to other applications in a manner that is transparent to those applications.

For example, client 210 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 210 and the operating system or file system on behalf of applications executing within the operating system environment.

Clients 210 may convey network-based services requests (e.g., access requests directed to hierarchical data structures in directory storage service 220) to and receive responses from network-based services platform 200 via network 260. In various embodiments, network 260 may encompass any suitable combination of networking hardware and protocols necessary to establish network-based-based communications between clients 210 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 210 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based services platform 200. It is noted that in some embodiments, clients 210 may communicate with network-based services platform 200 using a private network rather than the public Internet.

Different types of hierarchical data structures may be stored, managed, and or represented in different ways. FIG. 4 is a block diagram illustrating one example of a data model for a hierarchal data store that provides hierarchical data structures, according to some embodiments. A directory, for example may be a hierarchical data structure, such as directory structures 410a or 410n, and may be represented with circles or squares in the graph depicted of FIG. 4 (e.g., objects 400, 401, 402, 403, 404, 405, 406, 407, and 421). An object may have a globally unique identifier (GUID), zero or more attributes (key, value pairs), and zero or more links to other objects. In some embodiments, a directory may be one type of object which has zero or more child links to other objects, either directories or resources. Directory objects may have zero or one parent directory object, implying that directory objects and inks define a tree structure, in some embodiments. In FIG. 4, object 401 is an example of a directory object. Object 400 may be a root object that is the logical root multiple directory structures 410 and may not be visible to clients of directory storage service 220, in some embodiments. Resource objects (represented by squares such as resource objects 404, 405, 406, and 407) may be leaf objects in a directory structure 410. A resource object may have a unique external Id (e.g., client specified) and client-defined attributes. Resource objects can have more than one parent object (which would allow for some hierarchical data structures to be configured as a Directed Acyclic Graph (DAG). Object 405 in FIG. 4 is an example of a resource object and it has two parents (objects 402 and 403).

In some embodiments, multiple types of resource objects may be implemented. For example, in some embodiments, policy objects may be a type of resource object with two user-defined attributes: a policy type and policy document (e.g., describing a policy applied to applicable objects). For example, resource object 406 in FIG. 4 may be an example of a policy resource object. Another type of resource object may be an index resource object. For example, an index resource object may be an index on various attributes values of objects in the child objects and other descendant objects of the directory object to which the index object is attached. For example, if resource object 407 is an index object, then index object 407 may provide an index object for the attributes of child objects 402 and 403 as well as descendant objects 404, 405, and 406.

In some embodiments, a link may be a directed edge between two objects defining a relationship between the two objects. There may be many types of links, such as client visible link types and another link type for internal operation implementation. In some embodiments, a child link type may create a parent-child relationship between the objects it connects. For example, child link 'bb' connects object 401 and object 403. Child links may define the hierarchies of directory structures 410. Child links may be named in order to define the path of the object that the link points to. Another type of client visible link may be an attachment link. An attachment link may apply a resource object, such as a policy resource object or index resource object, to another resource object or directory object. Attachment links may not define the hierarchical structures of directory structures 410. For example, attachment link 'xx' applies the policy attribute stored in policy resource object 406 to directory object 402. Objects can have multiple attachments. In some embodiments, some attachment restrictions may be enforced, such as a restriction that not more than one policy resource object of any given policy type can be attached to a same object. A non-client visible type of link or implied link type may also be implemented in some embodiments, a reverse link. Reverse links may be used for optimizing traversal of directory structures 410 for common operations like resource object look-ups (e.g., policy lookups). Directory storage service 220 may maintain reverse links in the opposite direction of child and attachment links.

In various embodiments, objects in directory structures 410 can be identified and found by the pathnames that describe how to reach the object starting from the logical root object 400, starting with the link labeled "/" and following the child links separated by path separator "/" until reaching the desired object. For example, object 405 can be identified using the path: "/directoryA/aa/dd". As some objects may be children of multiple directory objects, multiple paths may identify an For example, the following path can also be used to identify object 405: "/directoryA/bb/ee". As directory structures 410 may be a collection of objects whose boundary is defined by the hierarchy of those objects in the collection (e.g., the resulting hierarchical data structure, such as the tree or DAG created by the links between objects). In this way, directory structures 410 may represent separate, independent, or partially independent, organizations.

To store the illustrated directory structures in hierarchical data structure store, the described objects, links attributes, and the like may be modeled after a Resource Description Framework (RDF) data, in some embodiments. To maintain multiple versions of the hierarchical data structures, versioning information may also be included to express how the data has changed over time. RDF data may be structured as (Subject, Predicate, Object) tuples. When including additional versioning information this structure may become: (Subject, Predicate, Object, Version, PreviousVersion). To represent the hierarchical data structures based on RDF, there may be multiple types of RDF predicates. In some embodiments, one type of RDF predicates may represent links of the hierarchical data structure and another type of RDF predicates may represent attributes of the hierarchical data structure. Different types of predicts may represent the hierarchical data structure differently. Link predicates may be between two objects, whereas attribute predicates may be between an object and a value. Since a single object might participate in several predicates of the same type, but with different values, predicates may begin with a common prefix and end in some additional type or naming information to aid in lookups. For example, the version entry in a tuple of a predicate may be the logical timestamp (e.g., transaction sequence number) at which the link or attribute was created, as all changes to a hierarchical data structure may utilize the transaction resolution process provided by transaction log storage 250 and may be assigned an ordered logical timestamp by transaction log storage 250.

As noted above in FIG. 3, storage hosts may maintain a current version of a hierarchical data structure and past versions of a hierarchical data structure. In at least some embodiments, different respective tables may be maintained for each hierarchical data structure, one table that stores the data for the current version and another table that stores immutable records for the previous versions. In various embodiments a current version table or previous versions table may be accessed to perform various operations for a hierarchical data structure. For example an access request may specify a query: "Find all children for Object whose ID is GUID_401 select GUID_401.child.* from CurrentVersion" or a query: "Find all policies for a resource object who's ID is GUID_405 along all paths to the root. To service such queries, a depth first traversal may be executed along the parent links. At each object along the path to the root, the following internal queries may be executed: internal query 1: "Find if the object has policies: select GUID_405.link.HasPolicy.* from CurrentVersion;" internal query 2: "If the object has policies returned in internal query 1, use the value from the link to get the policy document value from the policy object: select GUID_406.link.PolicyDoc from CurrentVersion;" internal query 3: "Find all parents for current object and perform internal queries 1-3 for each parent object until reaching the root of the directory structure. Please note that previous examples are not intended to be limiting as to the format, structure, syntax, or other ways in which queries may be expressed or processed with respect to hierarchical data structures.

FIG. 5 is a block diagram illustrating the use of a separate transaction log store to provide consistent storage for versioned hierarchical data structures, according to some embodiments. Multiple clients, such as clients 510a, 510b, and 510c may perform various access requests to a hierarchical data structure concurrently, such as various write requests 512a, 512b, 512c. In a least some embodiments, replica group 520 may include multiple storage hosts, such as hierarchy storage host 522a, 522b, and 522c that maintain versions of the hierarchical data structure that are available for servicing various access requests from clients 510. For example, clients 510 may submit different write requests 512 to hierarchy storage hosts 522 according to a routing schema which may direct access requests from each client to a different storage host in replica group 520 according to a load balancing scheme. Upon receiving the request, each hierarchy storage host 522 may perform various operations upon a current version of the hierarchical data structure at the storage host, then offer the writes 524 to transaction log storage 210 for commitment to directory structure log 530 including various information such as the affected or accessed data by performing the write request, the write request itself, and a transaction sequence number of other indication identifying the point-in-time of the current version of the hierarchical data structure at the storage host 522. Indications of commitment 526 or conflict may be provided to the respective storage hosts 522. For those writes that are committed, the directory structure log may be read and committed writes applied 532 to the respective versions of the hierarchical data structure maintained at storage hosts 522.

In some embodiments, archival worker(s) 550 may also read the directory structure log 530 to retrieve writes 534 for transmission as archived transactions or snapshots. Archival worker(s) 550 may then periodically or aperiodically update 542 an archived log 540 in archive storage service 270 and generate and send new snapshots 552 to be maintained as part of archived snapshots 550. In this way, the hierarchical data structure can be recreated at any point-in-time, for example by loading a snapshot onto a storage host and applying transactions from archived log 540 to reach a certain transaction sequence number so that the version of the hierarchical data structure at the storage number is consistent with a specified point-in-time. Archival worker may generate filtered snapshots for performing scaling events to move some directories from storage host to another, as discussed below.

Figure 6:
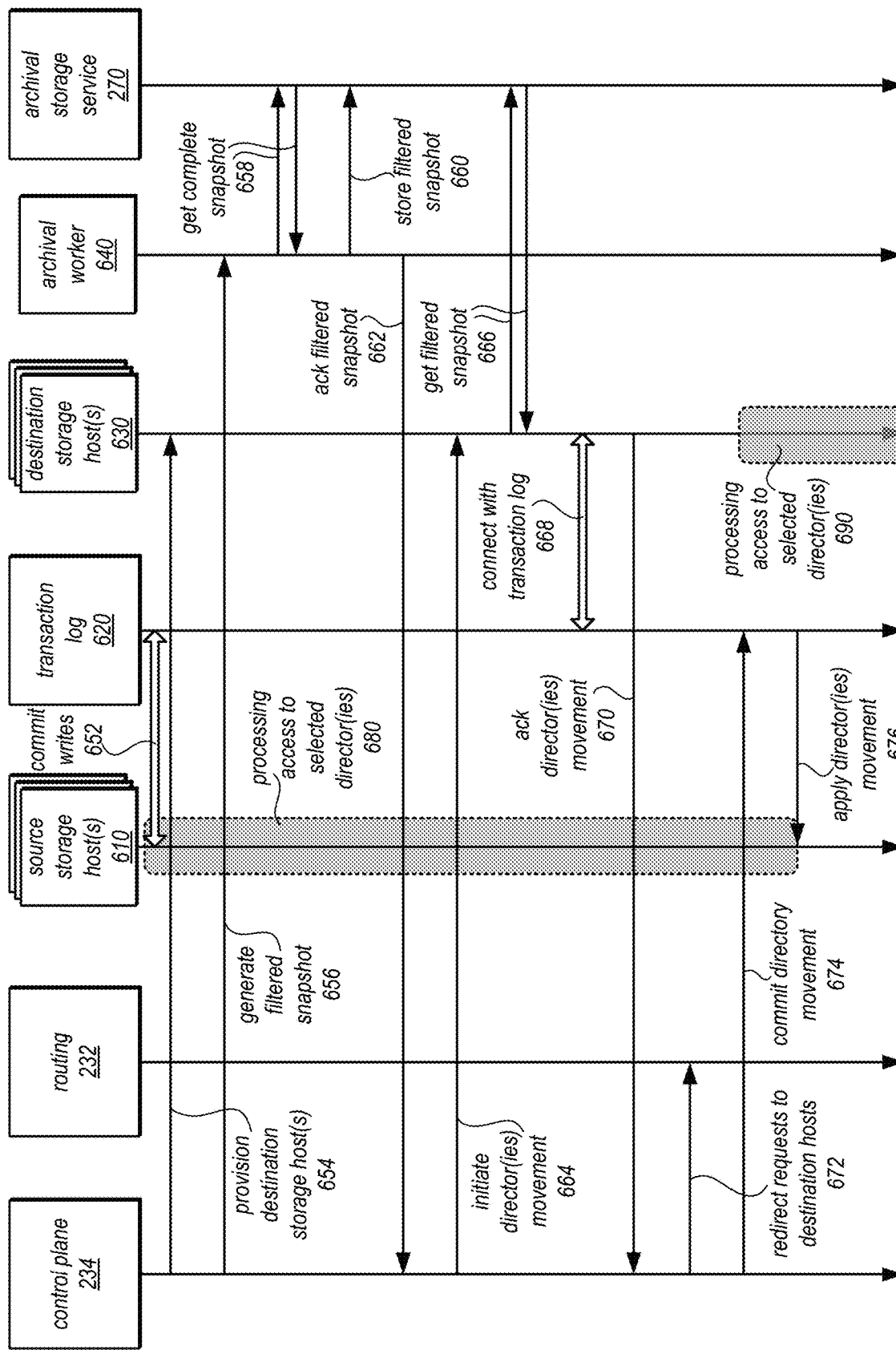
FIG. 6 is a sequence diagram illustrating a scaling event to move hierarchical data structures to different storage hosts, according to some embodiments.

As noted above, a control plane may detect scaling events for hosting hierarchical data structures. Scaling events may be automatically detected and performed, as discussed below with regard to FIG. 9, or may be manually triggered by a request (e.g., from a client, administrator, or other stakeholder via a command line interface, graphical user interface, or other programmatic interface). FIG. 6 is a sequence diagram illustrating a scaling event to move some hierarchical data structures from to different storage hosts, according to some embodiments. Source storage host(s) 610 may commit writes 652 to transaction log 620 in order to provide consistent updates to the multiple copies of the directories stored at source storage host(s) 610, including processing access requests to directories selected for movement as indicated at 680. Control plane 234 may detect a scaling event to move one or more directories from source storage host(s) 610 to destination storage host(s) 630, as discussed below with regard to FIG. 9. Control plain 234 may provision destination storage host(s) 654 (e.g., by sending a request to launch new instances of storage host(s) or reserve existing and available storage hosts-which may be already storing other directories). Control plane 234 may also send a request to archival worker 640 to generate a filtered snapshot 656 (e.g., sending a request indicating which director(ies) are moving to destination storage host(s) 630. Archival worker 640 may get a complete snapshot 658 of the directories maintained at source storage host(s) 610 and filter out those directories that are not moving to destination storage host(s) 630. Archival worker 640 may then store the filtered snapshot to archival storage service 270 and acknowledge generation of the filtered snapshot 662 to control plane 234.

Control plane 234 may then initiate the movement of the director(ies) 664, sending a request to destination storage host(s) 630. The request may identify the filtered snapshot to maintain at destination storage host(s) 630. Destination storage host(s) 630 may then get the filtered snapshot 666 from archival storage service 270. Within the filtered snapshot, in some embodiments, may be an indication of transaction log 620. In some embodiments, control plane 234 may provide the identity of transaction log 620 to destination storage host(s) 630. Destination hosts(s) may establish a connection 668 with transaction log 620. In some embodiments, the directory structures to be moved may still be available for writes at source storage host(s) 610 (which may commit the writes to transaction log 620 as discussed above with regard to FIG. 5). Once the connection 668 with transaction log 620 is established, destination storage host(s) may apply one or more changes to the filtered snapshot for writes committed after the generation of the snapshot, in some embodiments. Destination storage host(s) 630 may then send an acknowledgement 670 to control 234 indicating the completion of the movement of the directories (e.g., filtered snapshots obtained and changes applied). Control plane 234 may then send a request to routing 232 to redirect requests 672 to destination host(s) 630 for the moved directories so that destination storage host(s) 630 may begin processing access requests to the moved director(ies) as indicated at 690. For example, routing 232 may update mapping information, routing tables, or other information to redirect requests. Control plane 234 may commit the directory movement 674 to transaction 620, in some embodiments. The directory movement may be committed as any other write. Source storage host(s) 610 may apply the director(ies) movement 676 to block, stop, or end all further processing of access requests for the moved director(ies) (as indicated by the end of highlighted area 680)—although source storage hosts 610 may continue to process access requests for directories that are not moved. In some embodiments, source storage hosts may perform garbage collection or reclaim storage space for the moved director(ies), in order to make room for additional data for existing director(ies) or new director(ies).

Figure 7:
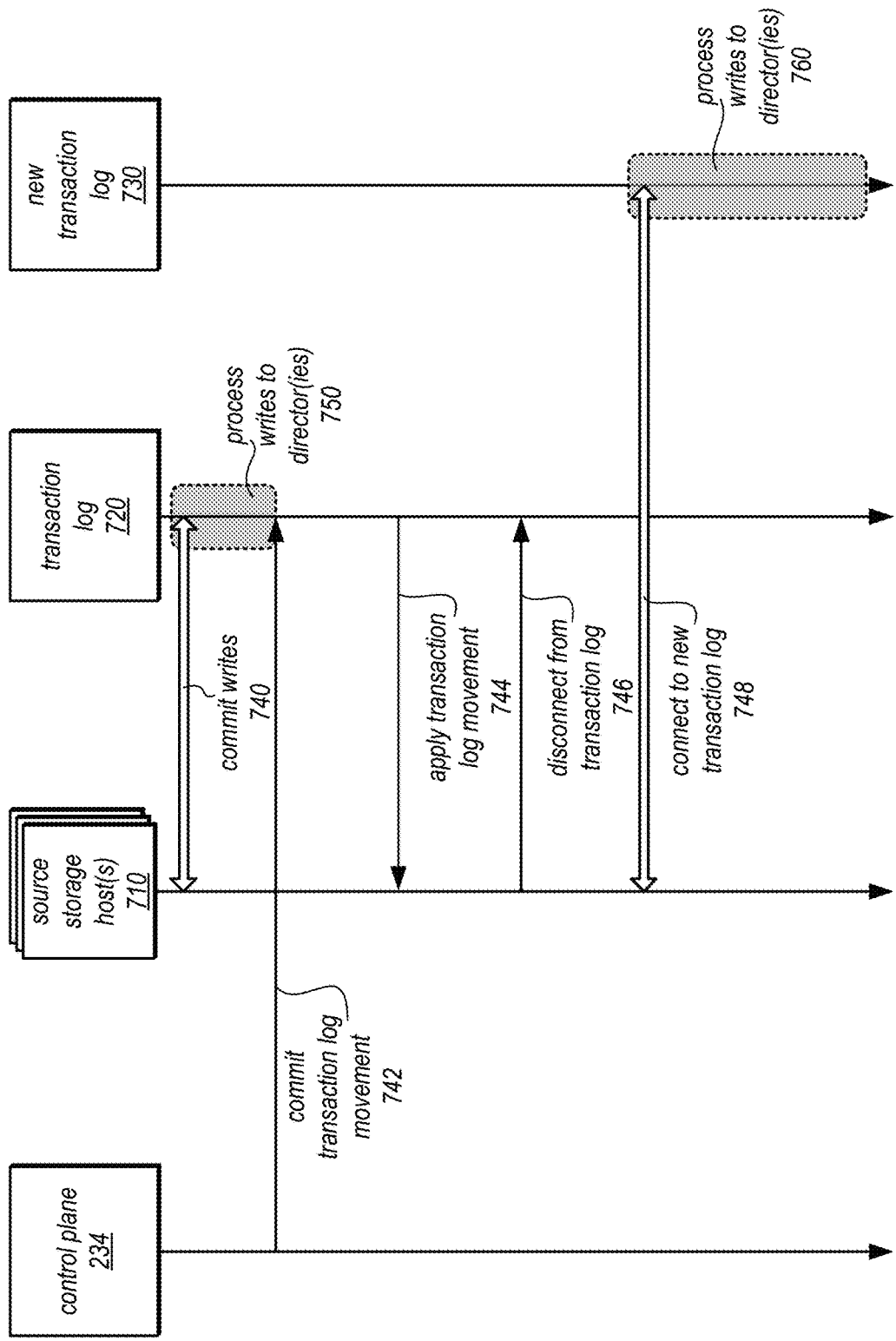
FIG. 7 is a sequence diagram illustrating a scaling event to move to a different a transaction log for hierarchical data structures, according to some embodiments.

Another type of scaling event that control plane 234 may detect and execute is an operation to scale or increase the capabilities for committing writes to one or more directories by moving the commitment of write requests to a new transaction log (while some other write requests for other directories may remain to be committed to the existing transaction log). FIG. 7 is a sequence diagram illustrating a scaling event to move to a different a transaction log for hierarchical data structures, according to some embodiments. Control plane 234 may detect a scaling event to add a new transaction log and move write commitments to the new transaction log for one or more directories maintained at source storage hosts. For example, as illustrated in FIG. 7, source storage host(s) 710 may commit writes 740 to transaction log 720 for multiple different directories (which may be hosted at different storage hosts in addition to source storage hosts 710).

As indicated at 742, control plane 234 may commit a transaction log movement for one or more of the directories to new transaction log 730. The commitment may identify which directories are moving to the new transaction log, and the identity of the new transaction log 730, in some embodiments. As discussed above with regard to FIG. 5, source storage host(s) 710 may become aware of the transaction log movement, and apply the transaction log movement 744 as change to metadata maintained at source storage host(s) 710 for processing requests directed to the director(ies) maintained at the source storage host(s). In some embodiments, once transaction log movement is committed 742, all subsequent write requests submitted to transaction log 720 may be denied (as indicated at 750). Source storage host(s) 710 may disconnect from transaction log 720 and connect to new transaction log 748, in some embodiments. Source storage hosts 710 may then begin accepting and submitting writes to the director(ies) at new transaction log 730, as indicated at 760.

Figure 8:
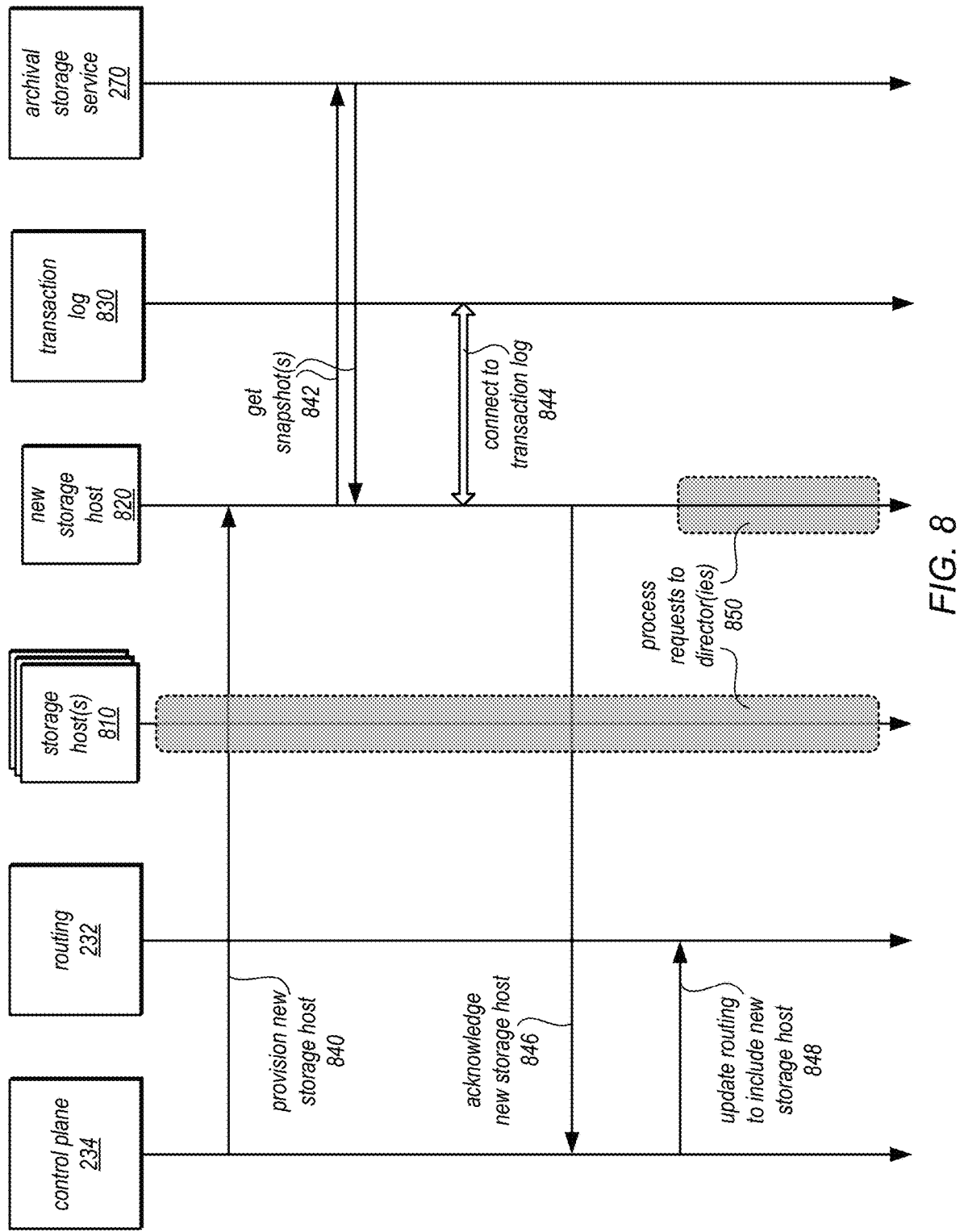
FIG. 8 is a sequence diagram illustrating a scaling event to add a storage host to a group of storage hosts that maintain hierarchical data structures, according to some embodiments.

Another type of scaling event control plane 234 may detect and execute is a scaling event to add storage hosts to a group of storage hosts in order to increase the number of storage hosts available for servicing read requests to directories maintained at the storage hosts. FIG. 8 is a sequence diagram illustrating a scaling event to add a storage host to a group of storage hosts that maintain hierarchical data structures, according to some embodiments. Control plane 234 may detect a scaling event to add a new storage host 820 to storage host(s) 810 that process requests to one or more directories (as indicated at 850). Control plane 234 may provision 840 new storage host 820 to process requests to director(ies). New storage host 820 may get one or more snapshots of the directories 842 from archival storage service 270. New storage host 820 may then connect 844 to transaction log 830 to begin applying committed changes at transaction log 830 to the retrieved snapshots. New storage host 820 may then acknowledge 846 that the new storage host 820 is available to process requests to directories as part of the group of storage host(s) 810. Control plane 234 may then update routing 232 to include the new storage host 848 as part of the group.

Figure 9:
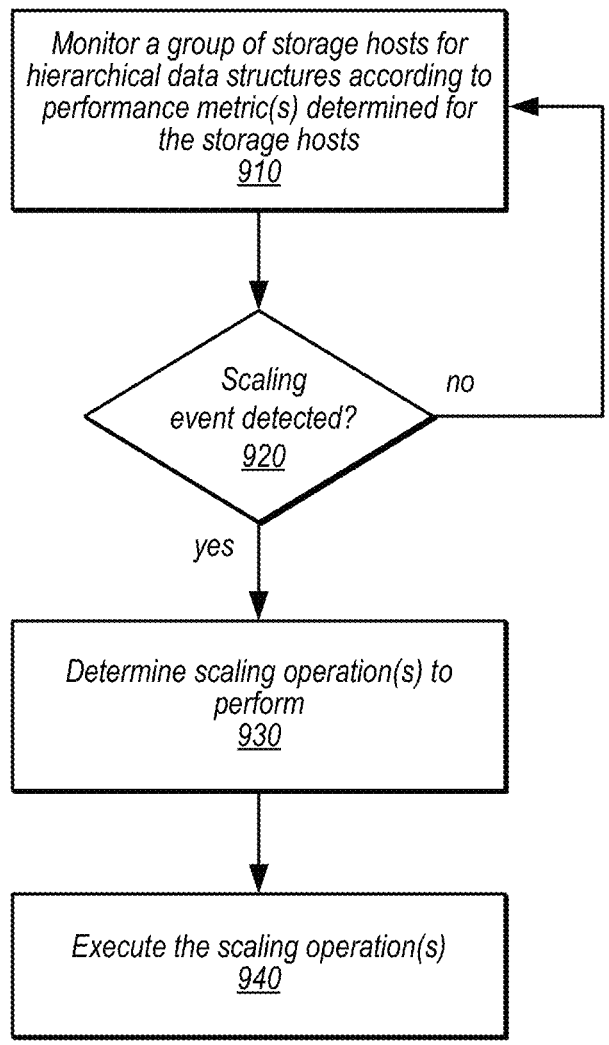
FIG. 9 is a high-level flowchart illustrating methods and techniques to detect and execute scaling events for hosting hierarchical data structures, according to some embodiments.

The directory storage service, access requests, and other techniques discussed in FIGS. 2 through 8 provide examples of a distributed data store storing a hierarchical data structure for a client and performing scaling events when hosting the hierarchical data structures in different scenarios. However, various other types of distributed storage systems may implement scaling events for hosting hierarchical data structure, which may utilize other numbers or types of components, that provide data storage for hierarchical data structures. FIG. 9 is a high-level flowchart illustrating methods and techniques to detect and execute scaling events for hosting hierarchical data structures, according to some embodiments. Various different distributed data stores including the embodiments described above may implement the techniques described below.

As indicated at 910, a group of storage nodes for hierarchical data structures may be monitored according to performance metric(s) determined for the storage hosts. For example, available storage capacity for hierarchical data structures currently stored on the storage hosts (or capacity for storing additional hierarchical data structures on the storage hosts may be examined. In another embodiment, the performance of different types of access requests, such as read requests or write requests may be evaluated, such as the average time to complete or rate at which requests are received. The performance metrics may be compared with one or more thresholds or other scaling event criteria. For example, scaling event criteria may indicate that if less than 10% of storage is available at the group of storage nodes for hierarchical data structures, then a scaling event to increase the capacity of the group of storage nodes may be detected, as indicated at 920. In other example, scaling event criteria may measure the rate at which read requests for one or more hierarchical data structures is received to determine if the rate exceeds a scaling even threshold, triggering a scaling even to increase the number of storage nodes that can handle read requests. In another example, scaling event criteria can monitor the rate at which write requests are completed with respect to a transaction log that ensures consistency among write requests attempted at different ones of the storage hosts. If the transaction log is overwhelmed with attempts to commit write requests (e.g., as indicated by a number of timeouts or long response times to acknowledge or deny a write request, then a scaling event may be triggered, as indicated at 920, to move one or more hierarchical data structures to a different transaction log for processing write requests.

As noted above, different types of scaling events may be detected. As indicated at 930, once a scaling event is detected, the scaling operation(s) to perform may be determined. For example, if multiple capacity problems are indicated by the detect scaling event (e.g., storage capacity, read capacity, or write capacity), an order or subset of scaling operations (e.g., movement of hierarchical data structures to other storage hosts, additional storage hosts, or movement of hierarchical data structures to other transaction logs) may be selected. For example, if storage capacity may prevent subsequent writes to a hierarchical data structure from being performed, then a movement operation to scale storage capacity at the storage hosts may be selected over an operation to increase the capacity to handle write requests by moving hierarchical data structures to a different transaction log. Different combinations of scaling operations may be performed (e.g., storage capacity scaling, read scaling, and/ or write scaling). As indicated at 940, once the scaling operation(s) are determined, the scaling operation(s) may be executed, in various embodiments, such as according to the techniques described above with regard to FIGS. 6-8 or below with FIGS. 10 and 11.

Figure 10:
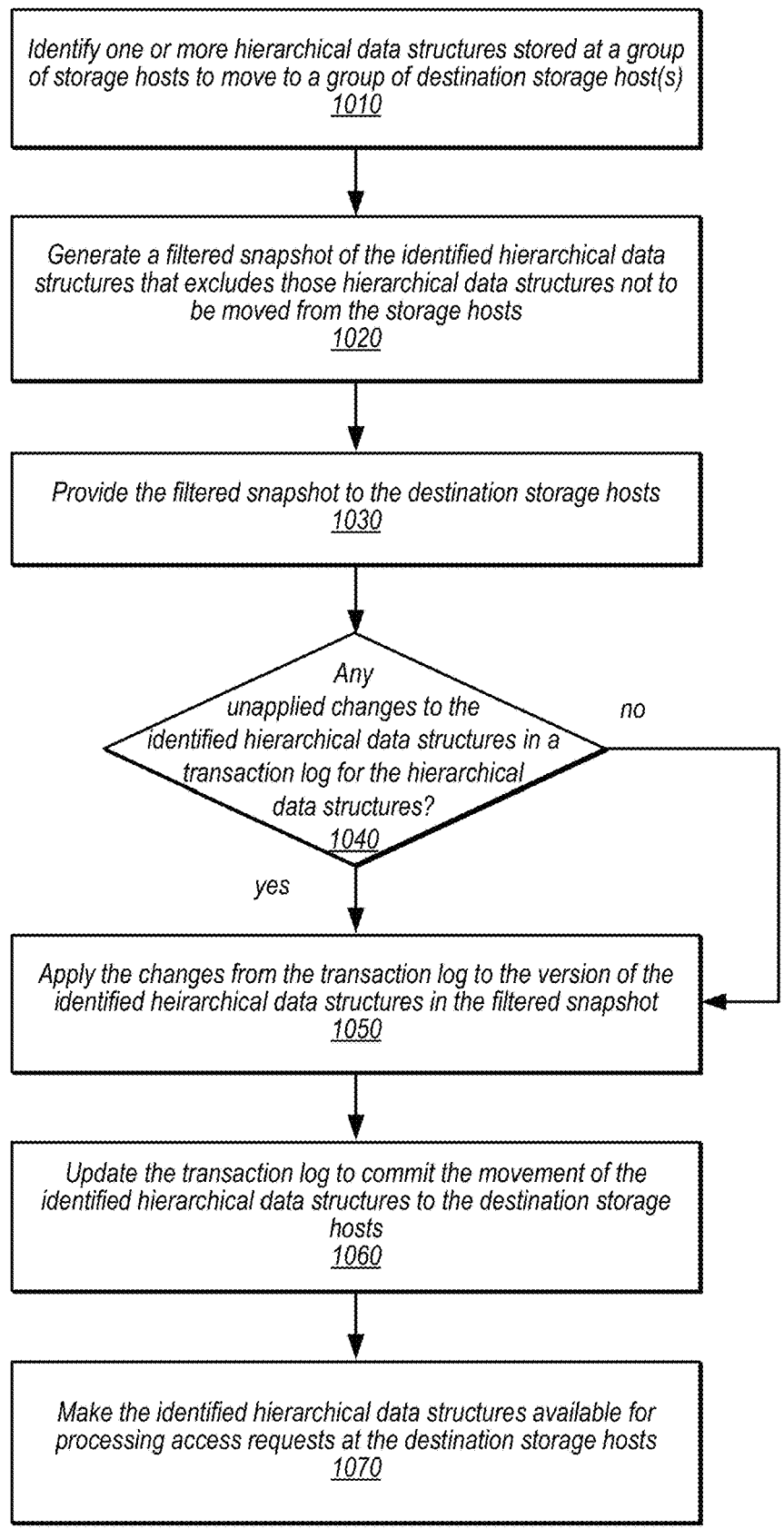
FIG. 10 is a high-level flowchart illustrating methods and techniques to move hierarchical data structures to different storage hosts, according to some embodiments.

FIG. 10 is a high-level flowchart illustrating methods and techniques to move some hierarchical data structures to different storage hosts, according to some embodiments. As indicated at 1010, one or more hierarchical data structures stored at a group of storage hosts may be identified to move to a group of destination storage host(s). For example, an operator, administrator, or other stakeholder could manually identify hierarchical data structures to move. In another embodiment, the hierarchical data structures may be evaluated based on different characteristics (e.g., size, frequency of access, age, etc.) to select one or more hierarchical data structures to move. For example, a machine-learning based model could be used to evaluate each of the stored hierarchical data structures to determine which hierarchical data structures if moved would provide the greatest additional capacity for the storage hosts (e.g., rate of growth, etc.).

As indicated at 1020, a filtered snapshot of the identified hierarchical data structures may be generated that excludes those hierarchal data structures not to be moved from the storage hosts, in some embodiments. For example, an old snapshot that includes all of the hierarchical data structures may be obtained (e.g. from archive storage, parsed, and rewritten to only include the identified hierarchal data structures. In other embodiments, the identified hierarchical data structures may be directly copied from one or more of the storage hosts (e.g., less busy storage hosts) and combined to generate the filtered snapshot.

As indicated at 1030, the filtered snapshot may be provided to the destination storage hosts, in some embodiments. For example, in some embodiments the filtered snapshot may be first placed in an intermediate storage location (e.g., archival storage 270 as discussed above in FIG. 6) or may be directly copied to the destination storage hosts (e.g., by an archival worker). In at least some embodiments, an archival worker or other component may generate the filtered snapshot instead of the storage hosts in order to reduce the burden on the storage hosts-which may still be receiving and processing access requests for the hierarchical data structures. In some embodiments, updates or changes may be made to the identified hierarchical data structures after the filtered snapshots are generated (so that the changes are not included in the filtered snapshots). These changes may be maintained in a transaction log for the hierarchical data structures. As indicated by the positive exit from 1040, if unapplied changes exist, then the changes may be obtained from the transaction log and applied to the version of the identified hierarchical data structures in the filtered snapshot, as indicated at 1050. As indicated at 1060, the transaction log may be updated to commit the movement of the identified hierarchal data structures to the destination storage hosts, as indicated at 1060. The identified hierarchical data structures may also be made available for processing access requests at the destination storage hosts, as indicated at 1070. For example, an update to a request router or other mapping information may direct requests for the identified hierarchical data structures to the destination storage hosts. Storage space (e.g., in memory or persistent storage devices) for the moved hierarchical data structures may be reclaimed for storing other data, in some embodiments.

Figure 11:
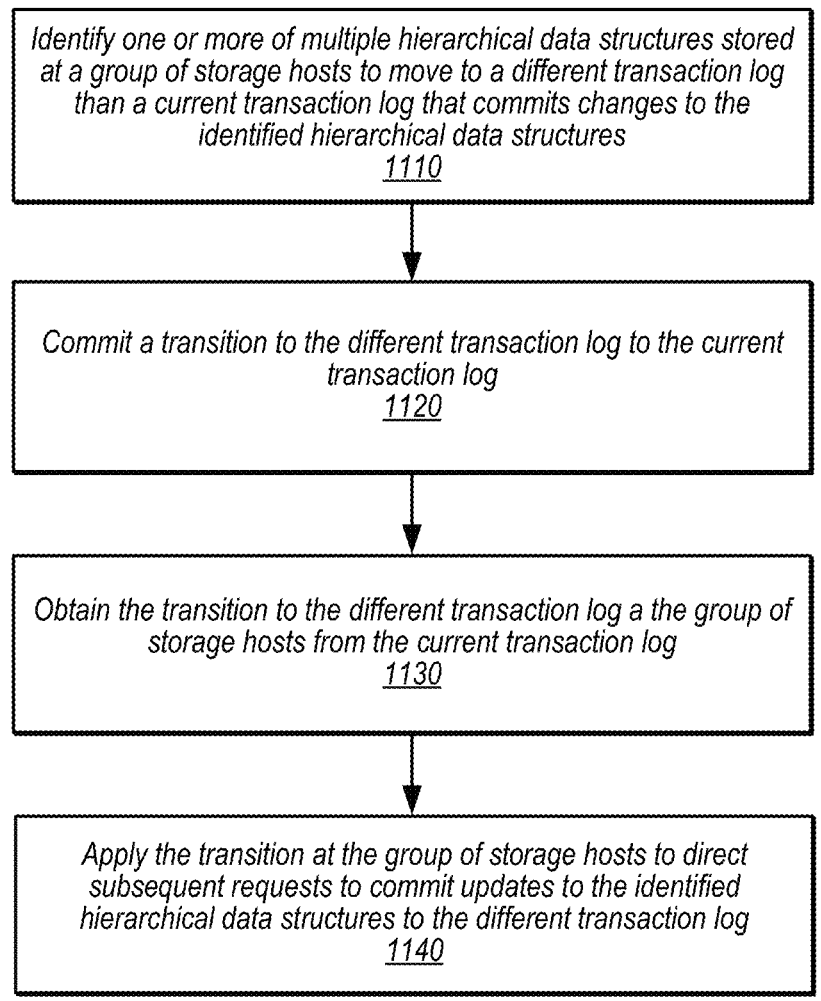
FIG. 11 is a high-level flowchart illustrating methods and techniques to move some hierarchical data structures to a different transaction log, according to some embodiments.

FIG. 11 is a high-level flowchart illustrating methods and techniques to move some hierarchical data structures to a different transaction log, according to some embodiments. One transaction log may provide a consistency mechanism to consistently apply updates to a hierarchal data structures stored in multiple copies amongst a group of storage hosts. Multiple different hierarchical data structures may be maintained at the group of storage hosts and multiple groups of storage hosts may be supported by the same transaction log (for multiple different hierarchical data structures). Another type of scaling event may move some of the hierarchical data structures to a different transaction log in order to reduce the burden of handling writes at the original transaction log.

As indicated at 1110, one or more of multiple hierarchical data structures stored at a group of storage hosts may be identified to move to a different transaction log than a current transaction log that commits changes to the identified hierarchical data structures. For example, an operator, administrator, or other stakeholder could manually identify hierarchical data structures to move. In another embodiment, the hierarchical data structures may be evaluated based on different characteristics (e.g., size, frequency of access, age, etc.) to select one or more hierarchical data structures to move. For example, a machine-learning based model could be used to evaluate each of the stored hierarchical data structures to determine which hierarchical data structures if moved would reduce the write demand on the transaction log. Once identified, a transition to the different transaction log may be committed to the current transaction log, as indicated at 1120. For example, a transaction request may be submitted indicating the point at which the transition occurs (in the log for records associated with the identified hierarchical data structures) and the location, connection information for the different transaction log. In at least some embodiments, once the transition is committed, the transaction log may block subsequent writes for the identified hierarchical data structures from committing at the transaction log.

As indicated at 1130, the transition to the different transaction log may be obtained by the group of storage hosts from the current transaction log (e.g., as discussed above with regard to FIG. 5). The transition may be applied at the group of storage hosts to direct subsequent requests to commit updates to the identified hierarchical data structures to the different transaction log, as indicated at 1140. For example, metadata for the hierarchical data structures indicating the location of the transaction log may be updated to point to the different transaction log.

The methods described herein may in various embodiments be implemented by any combination of hardware and software. For example, in one embodiment, the methods may be implemented by a computer system (e.g., a computer system as in FIG. 12) that includes one or more processors executing program instructions stored on a computer-readable storage medium coupled to the processors. The program instructions may be configured to implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 12:
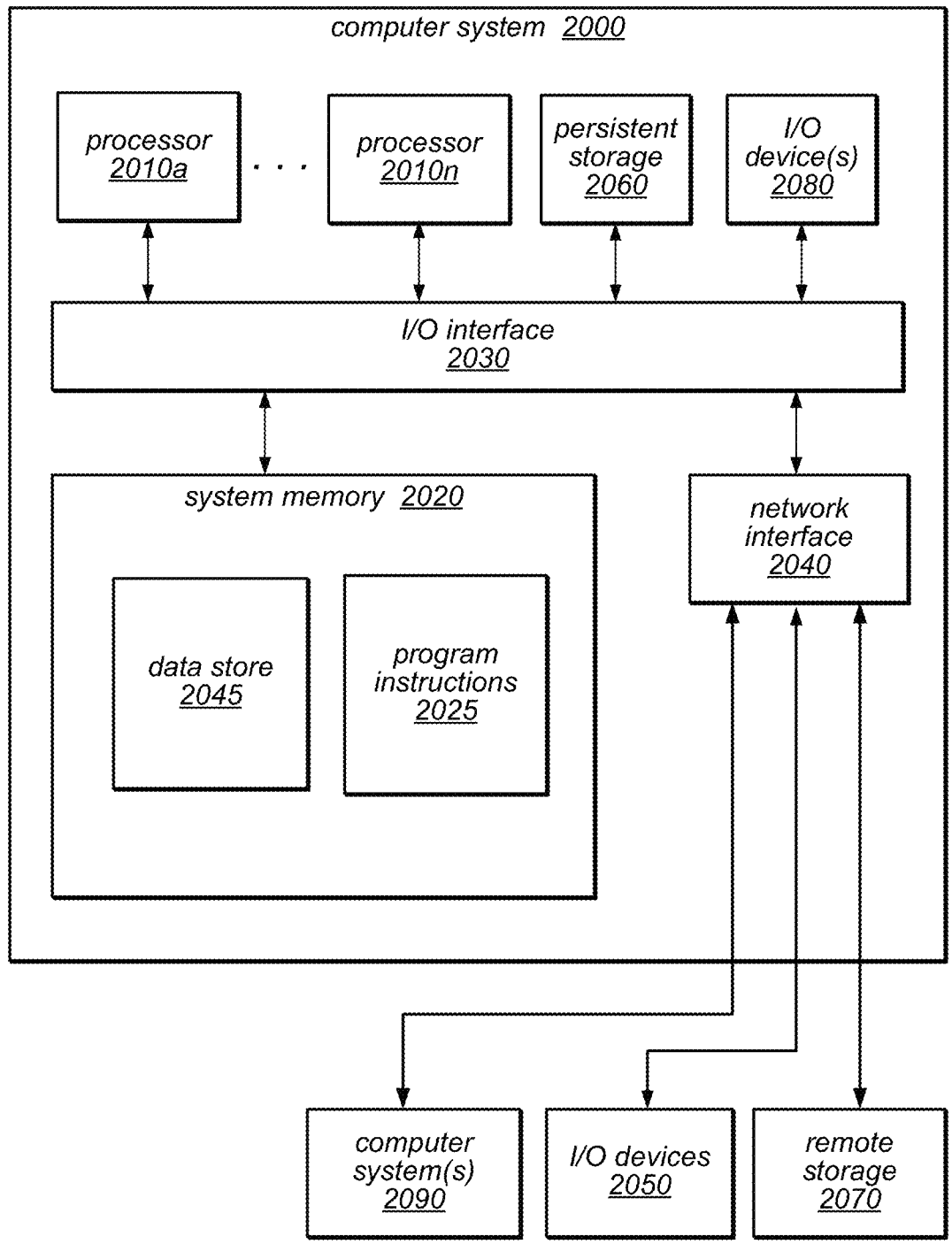
FIG. 12 is an example computer system, according to various embodiments.

FIG. 12 is a block diagram illustrating a computer system configured to implement scaling events for hosting hierarchical data structures, according to various embodiments, as well as various other systems, components, services or devices described above. For example, computer system 2000 may be configured to implement hierarchy storage nodes that maintain versions of hierarchical data structures or components of a transaction log store that maintain transaction logs for hierarchical data structures, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing node, compute node, computing device, or electronic device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the directory storage systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality described herein, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.)

conveyed via a communication medium such as a network and/or a wireless link, such as may be implemented via network interface 2040.

In some embodiments, system memory 2020 may include data store 2045, which may be configured as described herein. For example, the information described herein as being stored by the hierarchy storage nodes or transaction log store described herein may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement embodiments described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 12 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more compute nodes, respectively comprising at least one processor and a memory, configured to:

identify one or more of a plurality of hierarchical data structures stored at a plurality of storage hosts to move from a current transaction log to a different transaction log, wherein updates to the plurality of hierarchical data structures are applied to the plurality of hierarchical data structures amongst the storage hosts after the updates are successfully committed to the current transaction log;

commit to the current transaction log a transition to the different transaction log for the one or more identified hierarchical data structures;

obtain, by the plurality of storage hosts, the transition to the different transaction log from the current transaction log;

apply, at the plurality of storage hosts, the transition to the different transaction log, in order to direct subsequent requests to commit updates to the one or more identified hierarchical data structures to the different transaction log.

2. The system of claim 1, wherein the one or more identified hierarchical data structures are to be moved to a plurality of destination storage hosts, and wherein the one or more compute nodes are further configured to:

generate a filtered snapshot of the hierarchical data structures stored at the storage hosts that excludes those hierarchical data structures not to be moved to the destination storage hosts;

provide the filtered snapshot to the destination storage hosts;

update the transaction log to commit the movement of the one or more identified hierarchical data structures to the destination storage hosts; and make the one or more identified hierarchical data structures available for processing access requests at the destination storage hosts.

3. The system of claim 1, wherein the one or more compute nodes are further configured to:

detect an event to add at least one storage host to the plurality of storage hosts for processing access requests to the one or more identified hierarchical data structures; and provision the at least one storage host to include with the plurality of storage hosts, wherein the at least one storage host gets a snapshot of the one or more identified hierarchical data structures and connects with the different transaction log for the one or more identified hierarchical data structures.

4. The system of claim 1, wherein the one or more compute nodes are implemented as part of a network-based directory storage service, wherein each of the hierarchical data structures is a different directory structure hosted on behalf of a different client of the directory storage service.

5. The system of claim 1, wherein the one or more compute nodes are further configured to:

monitor one or more performance metrics for the plurality of storage hosts;

based at least in part on the one or more of the performance metrics, detect a scaling event to add the different transaction log; and provision the different transaction log to commit updates for the one or more identified hierarchical data structures.

6. The system of claim 1, wherein to apply, at the plurality of storage hosts, the transition to the different transaction log, the one or more compute nodes are further configured to change metadata maintained at the plurality of storage hosts for processing requests directed to the one or more identified hierarchical data structures stored at a plurality of storage hosts.

7. A method, comprising:

performing, by one or more computing devices:

identifying one or more of a plurality of hierarchical data structures stored at a plurality of storage hosts to move from a current transaction log to a different transaction log, wherein updates to the plurality of hierarchical data structures are applied to the plurality of hierarchical data structures amongst the storage hosts after the updates are successfully committed to the current transaction log;

committing to the current transaction log a transition to the different transaction log for the one or more identified hierarchical data structures;

obtaining, by the plurality of storage hosts, the transition to the different transaction log from the current transaction log;

applying, at the plurality of storage hosts, the transition to the different transaction log, in order to direct subsequent requests to commit updates to the one or more identified hierarchical data structures to the different transaction log.

8. The method of claim 7, wherein the identifying the one or more hierarchical data structures stored at the plurality of storage hosts to move comprises evaluating one or more characteristics of the hierarchical data structures to select the one or more identified hierarchical data structures out of the plurality of hierarchal data structures stored at the plurality of storage hosts.

9. The method of claim 7, further comprising:

detecting a scaling event to add the different transaction log;

provisioning the different transaction log to commit updates for the one or more identified hierarchical data structures.

10. The method of claim 7, wherein applying, at the plurality of storage hosts, the transition to the different transaction log further comprises changing metadata maintained at the plurality of storage hosts for processing requests directed to the one or more identified hierarchical data structures stored at a plurality of storage hosts.

11. The method of claim 7, wherein the one or more identified hierarchical data structures are to be moved to a plurality of destination storage hosts, further comprising:

generating a filtered snapshot of the hierarchical data structures stored at the storage hosts that excludes those hierarchical data structures not to be moved to the destination storage hosts;

providing the filtered snapshot to the destination storage hosts;

updating the transaction log to commit the movement of the one or more identified hierarchical data structures to the destination storage hosts; and making the one or more identified hierarchical data structures available for processing access requests at the destination storage hosts.

12. The method of claim 7, wherein the committing to the current transaction log a transition to the different transaction log is performed by a resource that is separate from the storage hosts.

13. The method of claim 7, wherein the identifying, the committing, the obtaining, and the applying are performed as part of a network-based directory storage service, wherein each of the hierarchical data structures is a different directory structure hosted on behalf of a different client of the directory storage service.

14. A non-transitory, computer-readable storage medium, storing program instructions that when executed by one or more computing devices cause the one or more computing devices to implement:
   identifying one or more of a plurality of hierarchical data structures stored at a plurality of storage hosts to move from a current transaction log to a different transaction log, wherein updates to the plurality of hierarchical data structures are applied to the plurality of hierarchical data structures amongst the storage hosts after the updates are successfully committed to the current transaction log;
   committing to the current transaction log a transition to the different transaction log for the one or more identified hierarchical data structures;
   obtaining, by the plurality of storage hosts, the transition to the different transaction log from the current transaction log;
   applying, at the plurality of storage hosts, the transition to the different transaction log, in order to direct subsequent requests to commit updates to the one or more identified hierarchical data structures to the different transaction log.

15. The non-transitory, computer-readable storage medium of claim 14, wherein, in identifying one or more of the plurality of hierarchical data structures to move from the current transaction log to the different transaction log, the program instructions cause the one or more computing devices to implement receiving a request to move the one or more hierarchal data structures that specifies the one or more hierarchical data structures.

16. The non-transitory, computer-readable storage medium of claim 14, wherein the program instructions cause the one or more computing devices to further implement:
   monitoring one or more performance metrics for the plurality of storage hosts;
   detecting, based at least in part on the one or more of the performance metrics, a scaling event to add the different transaction log; and
   provisioning the different transaction log to commit updates for the one or more identified hierarchical data structures.

17. The non-transitory, computer-readable storage medium of claim 14, wherein, in applying, at the plurality of storage hosts, the transition to the different transaction log, the program instructions cause the one or more computing devices to further implement changing metadata maintained at the plurality of storage hosts for processing requests directed to the one or more identified hierarchical data structures stored at a plurality of storage hosts.

18. The non-transitory, computer-readable storage medium of claim 14, wherein the one or more identified hierarchical data structures are to be moved to a plurality of destination storage hosts, and wherein the program instructions cause the one or more computing devices to further implement:
   generate a filtered snapshot of the hierarchical data structures stored at the storage hosts that excludes those hierarchical data structures not to be moved from to the destination storage hosts;
   provide the filtered snapshot to the destination storage hosts;
   update the transaction log to commit the movement of the one or more identified hierarchical data structures to the destination storage hosts; and
   make the one or more identified hierarchical data structures available for processing access requests at the destination storage hosts.

19. The non-transitory, computer-readable storage medium of claim 14, wherein the program instructions cause the one or more computing devices to further implement:
   detect an event to add at least one storage host to the plurality of storage hosts for processing access requests to the one or more identified hierarchical data structures; and
   provision the at least one storage host to include with the plurality of storage hosts;
   obtain, at the at least one storage host, a snapshot of the one or more identified hierarchical data structures; and
   connect the at least one storage host with the different transaction log for the one or more identified hierarchical data structures.

20. The non-transitory, computer-readable storage medium of claim 14, wherein the identifying, the committing, the obtaining, and the applying are performed as part of a network-based directory storage service, wherein each of the hierarchical data structures is a different directory structure hosted on behalf of a different client of the directory storage service.

* * * * *